US010882439B2

(12) United States Patent
Enyeart

(10) Patent No.: US 10,882,439 B2
(45) Date of Patent: Jan. 5, 2021

(54) BENDABLE CARGO SECUREMENT DEVICE AND METHOD

(71) Applicant: Tom Enyeart, Atkinson, IL (US)

(72) Inventor: Tom Enyeart, Atkinson, IL (US)

(*) Notice: Subject to any disclaimer, the term of this patent is extended or adjusted under 35 U.S.C. 154(b) by 309 days.

(21) Appl. No.: 15/429,036

(22) Filed: Feb. 9, 2017

(65) Prior Publication Data

US 2017/0225604 A1 Aug. 10, 2017

Related U.S. Application Data

(60) Provisional application No. 62/293,093, filed on Feb. 9, 2016.

(51) Int. Cl.
*B60P 7/08* (2006.01)
*B60P 7/10* (2006.01)
(Continued)

(52) U.S. Cl.
CPC .............. *B60P 7/08* (2013.01); *B60P 3/007* (2013.01); *B60P 7/0823* (2013.01); *B60P 7/0884* (2013.01); *B60P 7/0892* (2013.01); *B60P 7/10* (2013.01); *B60P 7/135* (2013.01); *B60P 7/16* (2013.01); *B60R 5/00* (2013.01);
(Continued)

(58) Field of Classification Search
CPC .. B60P 7/08; B60P 7/0823; B60P 7/16; B60P 3/007; B60P 7/135; B60P 7/10; B60P 7/0892; B60P 7/0884; B65D 85/54; B65D 81/053; B65D 81/051; B65D 81/107; B65D 81/1075; B65D 81/113; B65D 81/05;
(Continued)

(56) References Cited

U.S. PATENT DOCUMENTS 1,526,782 A 2/1925 Fleischer
2,821,941 A 2/1958 Reed
(Continued)

FOREIGN PATENT DOCUMENTS

RU 2399519 C2 9/2010

OTHER PUBLICATIONS

The International Bureau of WIPO, International Search Report and Written Opinion or application PCT/US2017/017257, dated Sep. 14, 2017.

*Primary Examiner* — Stephen T Gordon
(74) *Attorney, Agent, or Firm* — Hamilton IP Law, PC; Jay R. Hamilton; Charles A. Damschen

(57) ABSTRACT

A compact bendable cargo securement device for stabilizing unrestrained items in the bed or cargo area of a pick-up truck or storage area in a motorhome or recreational trailer is disclosed. It may also be used as a stabilizer doing woodwork and other jobs that require stability of the work platform. The device will conform to any surface and has the ability to wrap around objects—both regular and irregular shaped—and will hold them and keep them from shifting. As disclosed, the bendable cargo securement device is composed of a flexible tube loaded with filler material when used and deployed for securing objects. The flexible tube is preferably fabricated from rubber or any material allowing sufficient flexibility for the cargo securement device to wrap around items while having suitable strength to avoid puncture/destruction from deployment. Each end of the device requires a closure to contain the filler material.

15 Claims, 16 Drawing Sheets

(51) Int. Cl.
*B60P 7/135* (2006.01)
*B60P 3/00* (2006.01)
*B60P 7/16* (2006.01)
*B62D 33/04* (2006.01)
*B60R 5/04* (2006.01)
*B60R 5/00* (2006.01)
*B60R 7/00* (2006.01)
*B65D 81/05* (2006.01)
*B65D 81/113* (2006.01)
*B65D 81/107* (2006.01)
*B65D 85/00* (2006.01)
*B65D 85/08* (2006.01)

(52) U.S. Cl.
CPC ............... *B60R 5/04* (2013.01); *B60R 7/00* (2013.01); *B62D 33/04* (2013.01); *B62D 33/042* (2013.01); *B65D 81/05* (2013.01); *B65D 81/051* (2013.01); *B65D 81/053* (2013.01); *B65D 81/107* (2013.01); *B65D 81/1075* (2013.01); *B65D 81/113* (2013.01); *B65D 85/54* (2013.01); *B65D 85/08* (2013.01)

(58) Field of Classification Search
CPC .. B65D 85/08; B60R 5/04; B60R 7/00; B60R 5/00; B62D 33/042; B62D 33/04
USPC .... 410/94, 95, 121, 155, 39, 40, 87, 88, 97, 410/117–119; 280/758, 759; 224/403, 224/404, 42.33, 42.34; 206/522, 523, 206/524, 592; 248/351
See application file for complete search history.

(56) References Cited

U.S. PATENT DOCUMENTS

| | | | |
|---|---|---|---|
| 3,414,140 A * | 12/1968 | Feldkamp | B60P 7/065 |
| | | | 383/3 |
| 4,122,637 A | 10/1978 | Runge et al. | |
| 4,153,089 A | 5/1979 | Veilleux | |
| 4,339,142 A | 7/1982 | Tanner et al. | |
| D377,475 S | 1/1997 | Bowen | |
| 5,865,580 A * | 2/1999 | Lawrence | B60P 7/0892 |
| | | | 410/117 |
| 5,897,138 A | 4/1999 | Hall | |
| 6,196,287 B1 | 3/2001 | Haberkorn | |
| D501,313 S | 2/2005 | Kim | |
| 7,523,961 B2 | 4/2009 | Watkins | |
| 2003/0206782 A1* | 11/2003 | Toglia | B60P 7/0884 |
| | | | 410/94 |
| 2006/0263165 A1* | 11/2006 | Roloff | B60P 3/073 |
| | | | 410/119 |
| 2007/0210569 A1 | 9/2007 | Anderson et al. | |

* cited by examiner

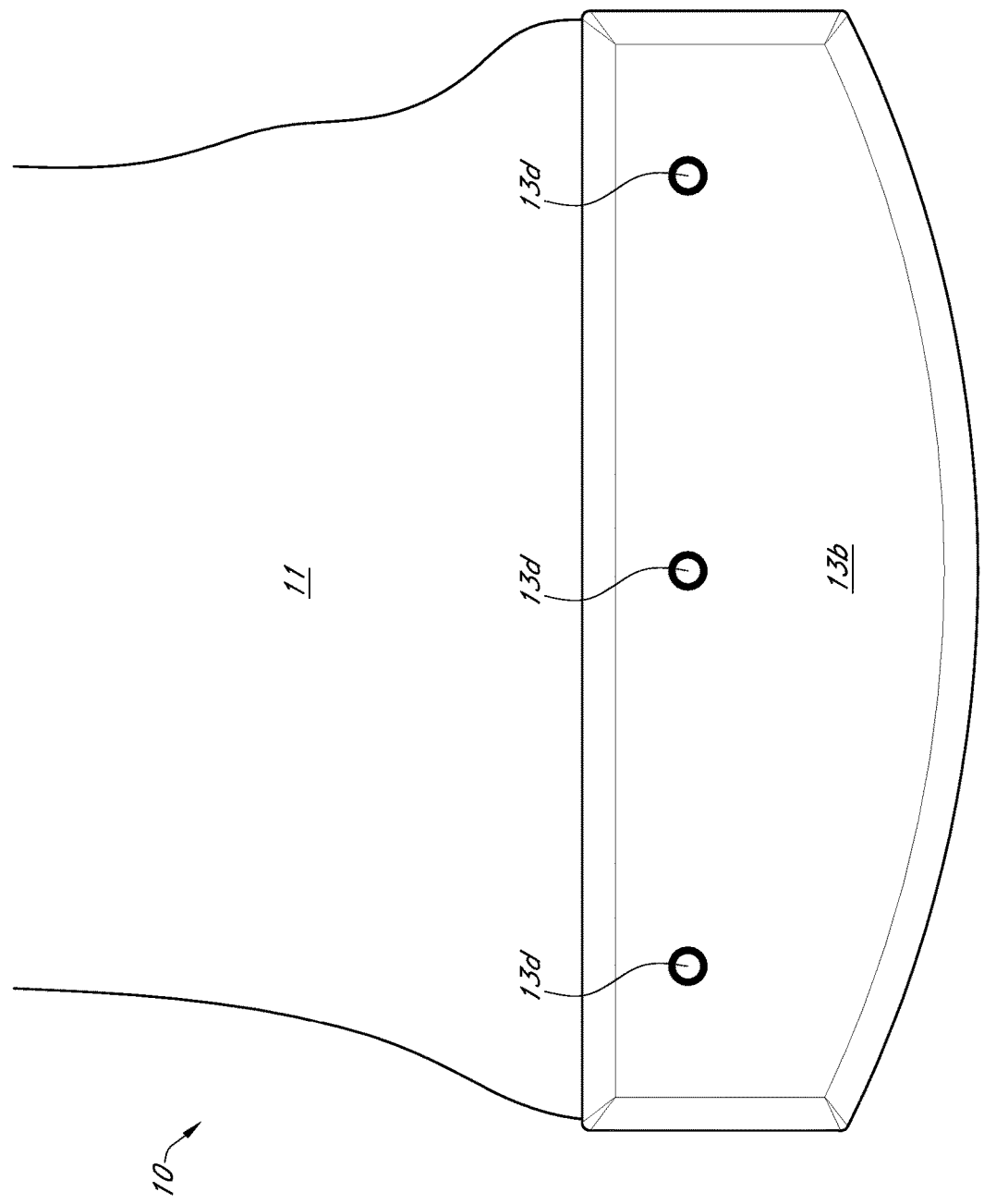

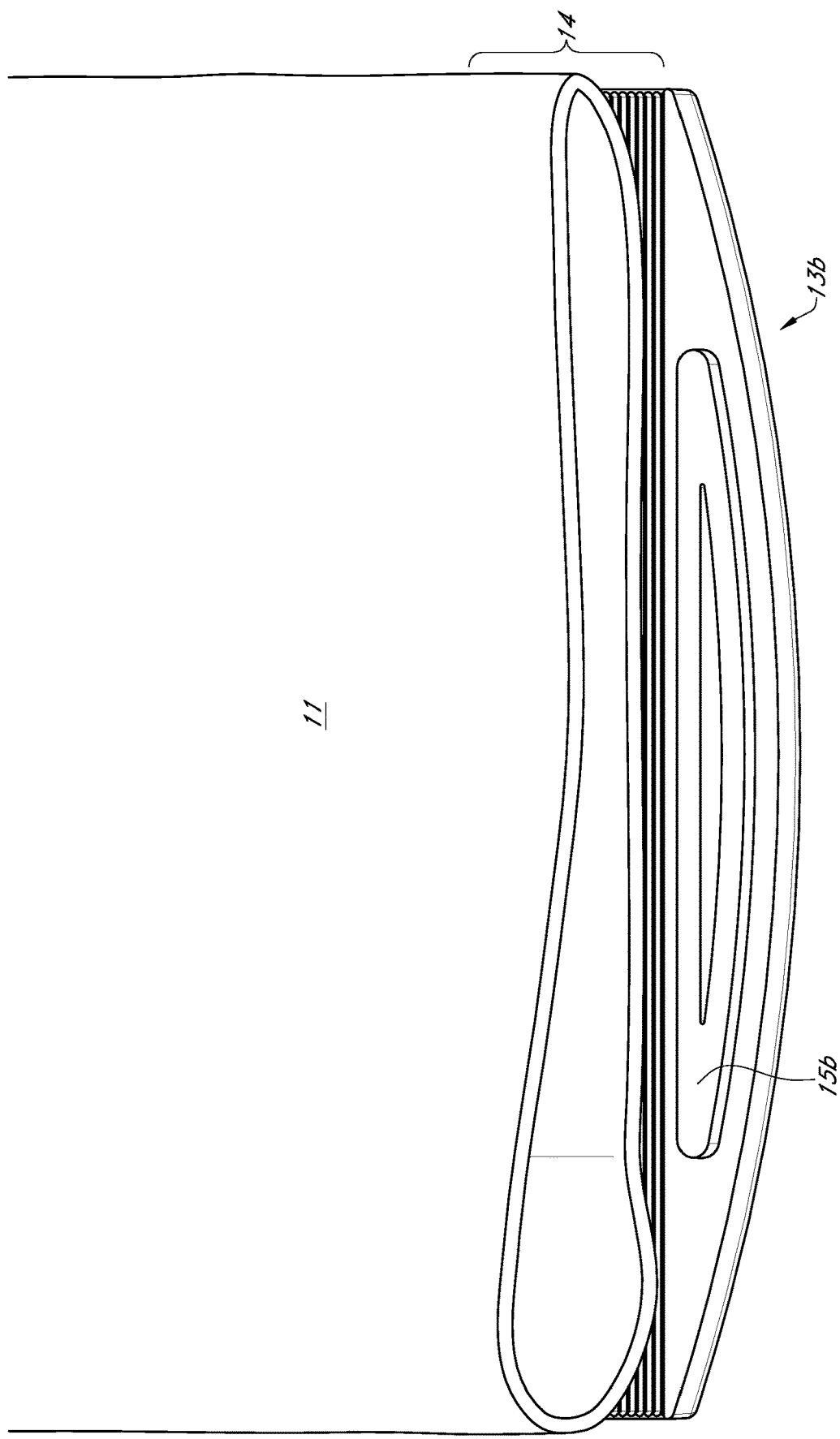

BENDABLE CARGO SECUREMENT DEVICE AND METHOD

CROSS REFERENCE TO RELATED APPLICATIONS

Applicant states that this application claims the filing benefit of provisional U.S. Pat. App. No. 62/293,093 filed on Feb. 9, 2016, and said application is incorporated by reference herein in its entirety.

STATEMENT REGARDING FEDERALLY SPONSORED RESEARCH OR DEVELOPMENT

No federal funds were used to create or develop the invention herein.

REFERENCE TO SEQUENCE LISTING, A TABLE, OR A COMPUTER PROGRAM LISTING COMPACT DISK APPENDIX

N/A

FIELD OF THE INVENTION

The present invention relates, in general, to securing cargo in a cargo area of a motor vehicle and, more particularly, this invention relates to an apparatus for securing various shaped articles in the cargo area of a vehicle which will conform to the regular shapes of individual pieces of cargo and irregular shapes of combinations of cargo.

BACKGROUND OF THE INVENTION

Applicant submits herein the published patent application Cargo Snake as described for example in published U.S. Pat. App. No. 20070210569 to Anderson, hereby incorporated by reference in its entirety, which generally describes an elongated tubular member made of plastic having each of a first predetermined shape and a predetermined length filled for the purpose of wrapping around and securing cargo.

Additional Prior Art: The following patents are incorporated by reference for purposes of enablement.

| Patent | Applicant | Title |
| --- | --- | --- |
| U.S. Pat. No. 2,821,941 | Gar Wood Ind Inc | Dunnage bar |
| U.S. Pat. No. 4,153,089 | Veilleux Roger L | Flexible container for storing sand |
| U.S. Pat. No. 4,339,142 | Douglas Tanner | Inner tube traction device |
| U.S. Pat. No. 5,897,138 | Hall; William M. | Vehicle ballast receptacle |
| U.S. Pat. No. 6,196,287 | Robert W. Haberkorn | Courier expressable cargo quilt and method therefor |
| U.S. Pat. No. 7,523,961 | Watkins Travis R | Truck bed ballast system |
| USD377475 | | Pickup truck bed stabilizer |
| USD501313 | Bethel International, Inc. | Purse |

The incorporation of the prior art references is not an admission by the Applicant as to relevancy as of prior art as to its teaching any particular element or combination of elements as found in the prior art.

SUMMARY OF THE INVENTION

This present disclosure relates to securement of cargo using a bendable tubular type member with further improvements and enhancements over the teachings of Anderson which Applicant has found lacking when deployed for its intended purpose of cargo deployment. Anderson requires the ends of a "flexible" tube to be permanently sealed when in use. Anderson discloses use of plastic for the "flexible" tube which Applicant has found to be insufficiently flexible or bendable i.e. constructed of material too rigid and inelastic to allow proper bending and shaping for sufficient engagement with articles to be stored—particularly those having irregular shapes as disclosed and discussed further herein. Anderson reduces the utility of the flexible tube as a securement structure as the weighted material inside the flexible tube makes it cumbersome to transport or store when not in use. Further, the utility of Anderson is reduced as shown because Anderson teaches interlocking the ends of the flexible tube during deployment or attachment of the ends to the cargo area. The present disclosure is not so limited.

The compact flexible securement device as disclosed is useful for stabilizing unrestrained items in the bed or cargo area of a pick-up truck or storage area in a motorhome or recreational trailer as disclosed. The bendable and sufficiently flexible securement device may also be deployed in cars, trucks, SUVs and ambulances. In another deployment it may be used as a stabilizer doing woodwork and other jobs that require stability of the work platform. The securement device will conform to any surface and has the ability to wrap around objects—both regular and irregular shaped—and will hold them and keep them from shifting. As disclosed the tube may be fabricated from butyl rubber (synthetic) or natural rubber. The securement device may range in length from 1 foot to 12 foot for deployment. The tube of the securement device may have a stored diameter of 2 inch to 10 inches. The tube should be fabricated from material having sufficient flexibility and bendability to allow the securement device to wrap around items while having suitable strength to avoid puncture/destruction from deployment. Further, the material chosen should not allow absorption or invasion of fluids into the interior of the tube. In one embodiment, the wall thickness of the tube is in the range of 0.9 mm to 4.0 mm and the material for construction is butyl rubber. As disclosed, the securement device is composed of a tube which may be filled with filler material when deployed for increased functionality and clamped at each end as disclosed. Each end of the device requires a closure, to contain the filler material inserted in the tube during deployment and use. Suitable fill materials include pea gravel, rock, crushed rock or dirt. Depending on the length and diameter selected for the securement device the deployed weight can range from 15-100 pounds. As discussed further herein, the clamp system shown herein further enhances the utility of the present disclosure across all deployments allowing compacted unfilled storage and transport prior to and/or after filled use and deployment of the bendable cargo securement device.

BRIEF DESCRIPTION OF THE DRAWINGS

The accompanying drawings, which are incorporated in and constitute a part of this specification, illustrate embodiments and together with the description, serve to explain and illustrate the principles of the BENDABLE CARGO SECUREMENT DEVICE AND METHOD (hereinafter referred to simply as "Securement Device") as disclosed herein.

FIG. 2B is a view of the bottom side of the clamp of the Securement Device disclosed.

FIG. 5 is a perspective view of the end of the tube positioned on the bottom portion of the clamp.

DETAILED DESCRIPTION

| Element Description | Element Number |
|---|---|
| Pick-up box | 1 |
| End gate | 2 |
|  | 3 |
| Fill material | 4 |
|  | 5 |
|  | 6 |
|  | 7 |
|  | 8 |
|  | 9 |
| Bendable Cargo Securement Device | 10 |
| Flexible tubular section (tube) | 11 |
| Tube wall | 11a |
| Tube opening | 11b |
| Tube end | 11c |
| Tube interior | 11d |
| Closure device | 12 |
| Clamp | 13 |
| Top (first) portion | 13a |
| Bottom (second) portion | 13b |
| Apertures | 13c |
| Guide tube | 13d |
| Contact zone | 14 |
| Contact ridges | 14a |
| Contact recesses | 14b |
| Locking Zone | 15 |
| Locking Recess | 15a |
| Locking Ridge | 15b |
|  | 16 |
| Fastener | 17 |
|  | 18 |
|  | 19 |
| Securable objects | 20 |
| Securable objects perimeter | 20a |
| Log | 21 |
| Log perimeter | 21a |
| Chain Saw | 22 |
| Chain saw perimeter | 22a |
| Tool Box | 23 |
| Tool Box perimeter | 23a |
| LP Tank | 24 |
| LP Tank perimeter | 24a |
| Gas container | 25 |
| Gas container perimeter | 25a |
| Oil container | 26 |
| Battery | 27 |
| Shipping (storage) box | 30 |

DETAILED DESCRIPTION

Before the various embodiments and deployments of the Securement Device are disclosed and described herein, it is to be understood that the Securement Device as described is not limited to specific methods, specific components, or to particular implementations. It is also to be understood that the terminology used herein is for the purpose of describing particular embodiments only and is not intended to be limiting. The present application may refer to the bendable cargo securement device disclosed herein alternatively by applicant's trademark "Cargo Wrap" without departure from the present disclosure.

Figure 8:
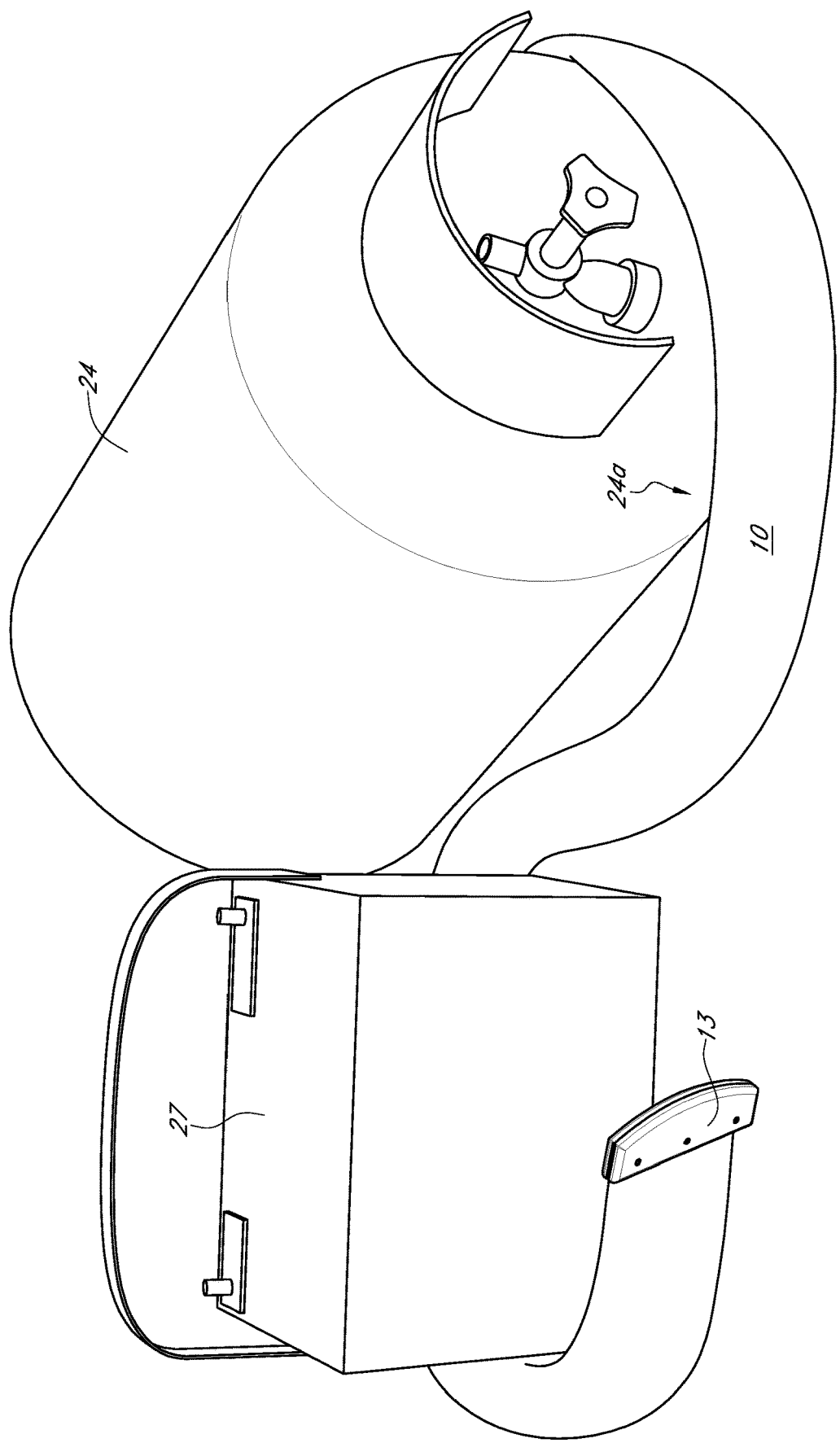
FIG. 8 is a perspective view of the Securement Device as deployed to secure an LP tank and a car battery.
Figure 9:
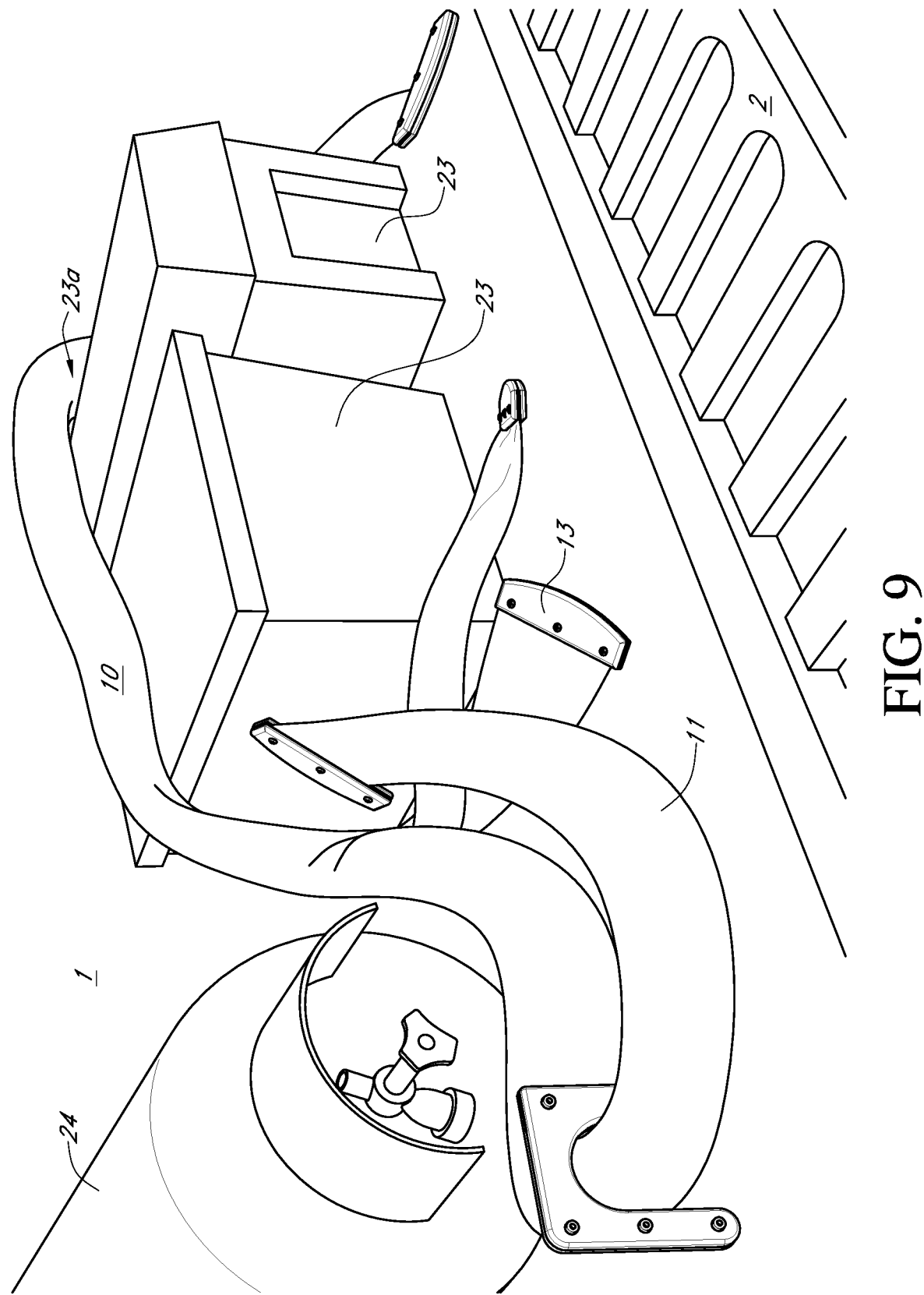
FIG. 9 is a perspective view of the Securement Device deployed to secure a combination of items in a pick-up box including a LP tank and various boxes wherein the securement device is positioned over the boxes and in front of the tank in the pick-up box.
Figure 10:
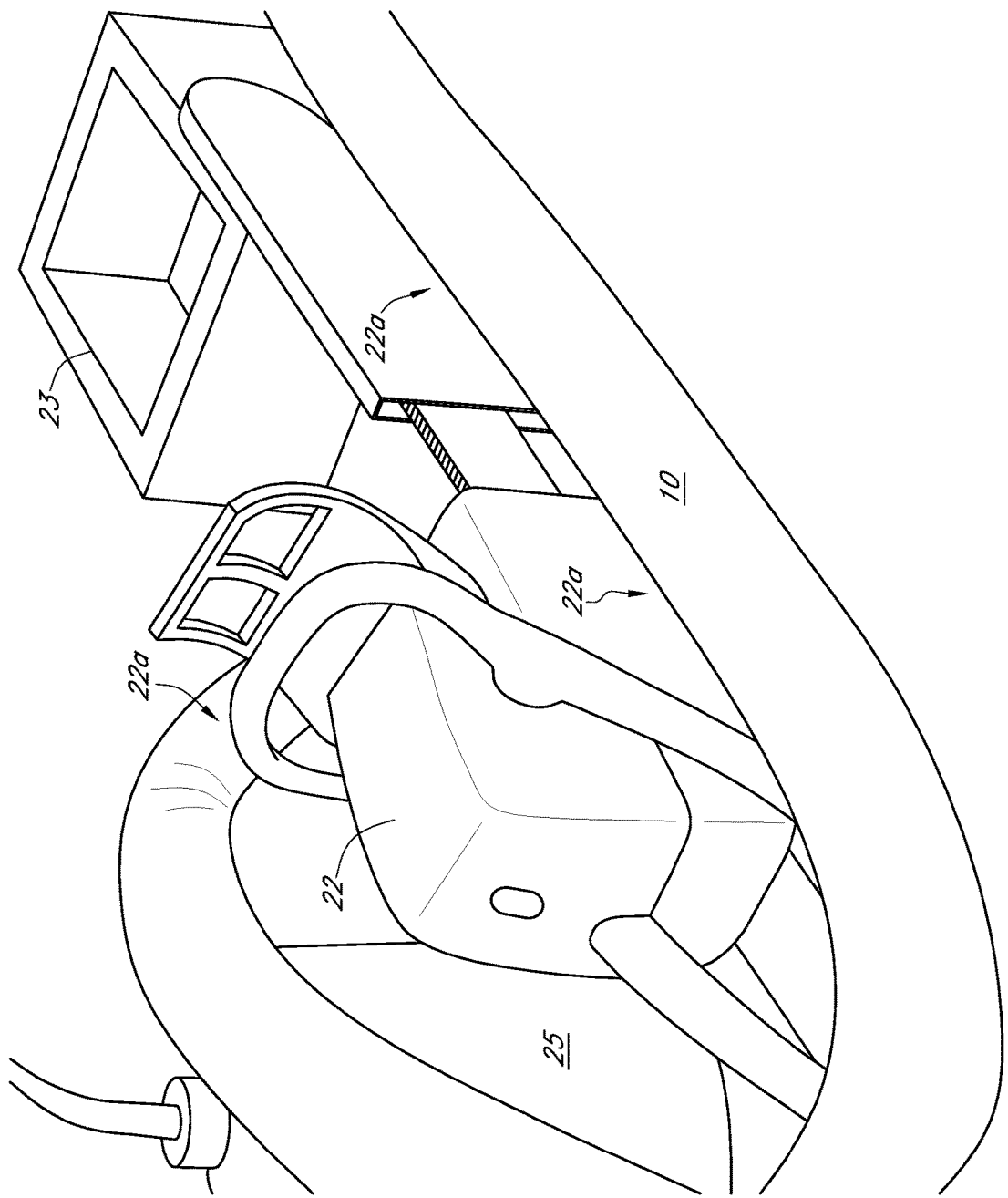
FIG. 10 is a top front perspective view of the Securement Device wherein the tube of the bendable securement device is positioned around chain saw and a box in the pick-up box.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally"

means that the subsequently described event or circumstance may or may not occur, and that the description includes instances where said event or circumstance occurs and instances where it does not. Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes. Disclosed are components that can be used to perform the disclosed Securement Device and method of deploying and using or unloading and storing the Securement Device 10 for use with single objects 20 having regular shapes (i.e. a tool box 23, oil container 26 and battery 27 as shown in FIGS. 6,8, 9 and 10) or irregular shapes (logs 21 or chain as shown in FIGS. 7 and 10) or combinations of logs 21 and tool boxes 23 or battery 27 and LP tank 24 having regular and irregular shapes (as shown in FIGS. 6-10). One of ordinary skill will appreciate that regular shaped securable objects 20 may have sides that are all equal and angles that are all equal. Irregular shapes have sides and angles of any length and size such as for example pentagons, hexagons and or octagons, without restriction or limitation. Irregular means unpredictable, with at least one variation in the dimension of a side or the shape of the side. The perimeter of a chainsaw 22, as illustrated in FIG. 10, is one example of an irregular shape as used herein as it has three sides of unequal length with a fourth side being of a generally varying radiused curve. One perimeter of a stack of firewood logs 21, as illustrated in FIG. 7, is another example of unpredictability as the dimensions (length, width, radius) of the logs 21 as well as the shape can vary from log to log as well as the order or arrangement of any particular combination of pieces due to the amorphous nature of a log 21 which is a natural bio-based product.

These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all Securement Device 10. This applies to all aspects of this application including, but not limited to, components of a Securement Device 10. Thus, if there are a variety of additional components that can be added it is understood that each of these additional components can be added with any specific embodiment or combination of embodiments of the Securement Device 10. The present Securement Device 10 may be understood more readily by reference to the following detailed description of preferred embodiments and the examples included therein and to the Figures and their previous and following description.

Illustrative Embodiment of Device

Figure 1:
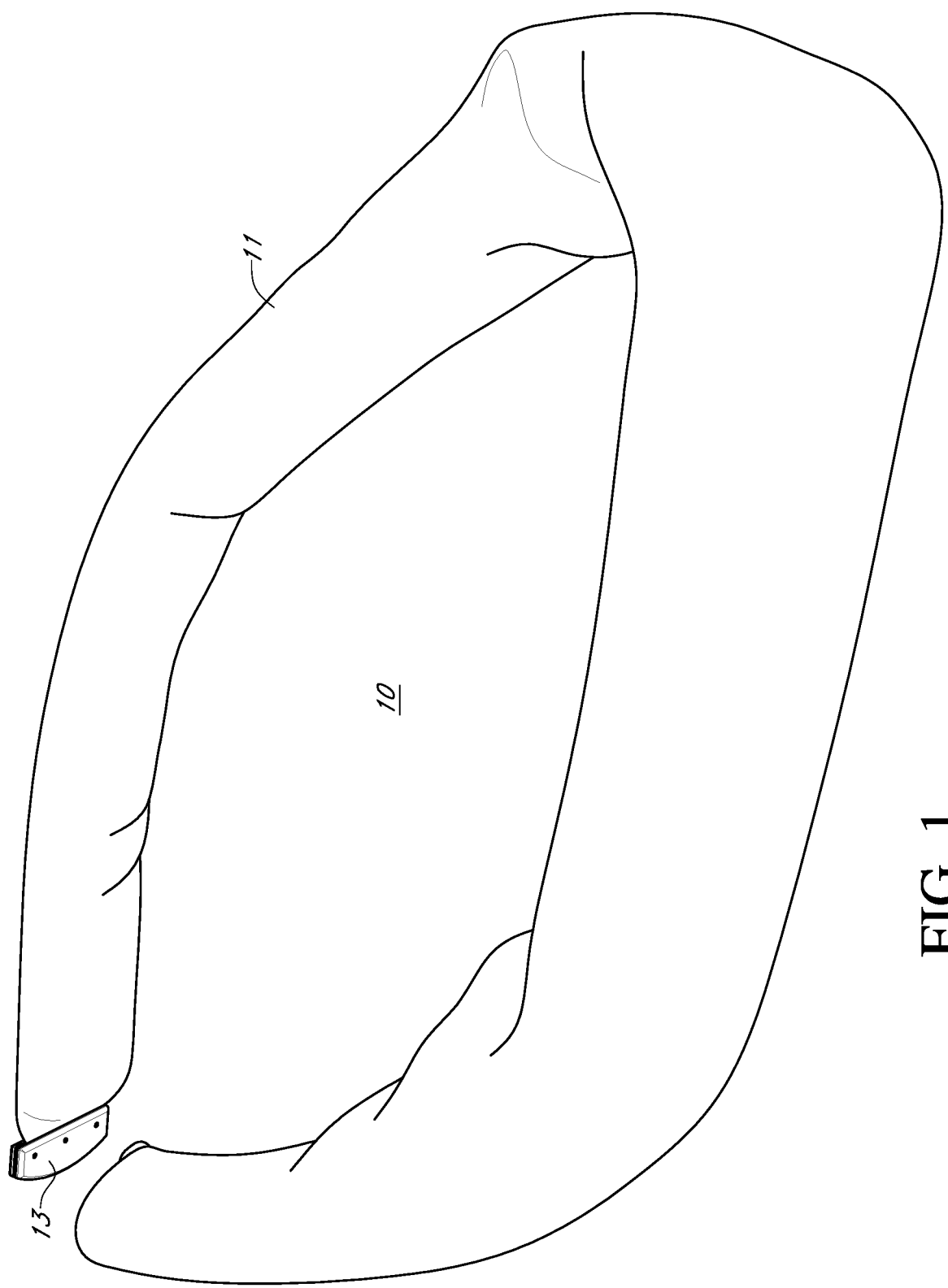
FIG. 1 is a perspective view of the Securement Device as disclosed.

FIG. 1 is a perspective view of the Securement Device 10 as disclosed. As shown, the Securement Device 10 as constructed is sufficiently bendable and flexible that the clamps 13 positioned at the ends of the tube 11 may touch or almost touch when the Securement Device 10 is wrapped around itself. Further, the bendability of the Securement Device 10 may be modified as needed by increasing or decreasing the amount of fill material 4 positioned in the interior of the tube 11. Further, removal or addition of fill material 4 also allows for alteration of the flexibility or bendability of the Securement Device 10. Although not shown, one of ordinary skill will appreciate that suitable fill material 4 may be chosen from the group including pea gravel, rock, crushed rock and dirt, depending on the application desired. Typically, it is preferable to choose a material which is relatively dense, clean and dry such as pea gravel, without limitation or restriction, to avoid the Securement Device 10 losing its flexibility in cold weather due to moisture in the fill material freezing. As shown, the material of fabrication selected for the tube 11 is butyl rubber, without limitation or restriction, which is flexible and relatively impermeable to outside fluid intrusion.

Figure 2A:
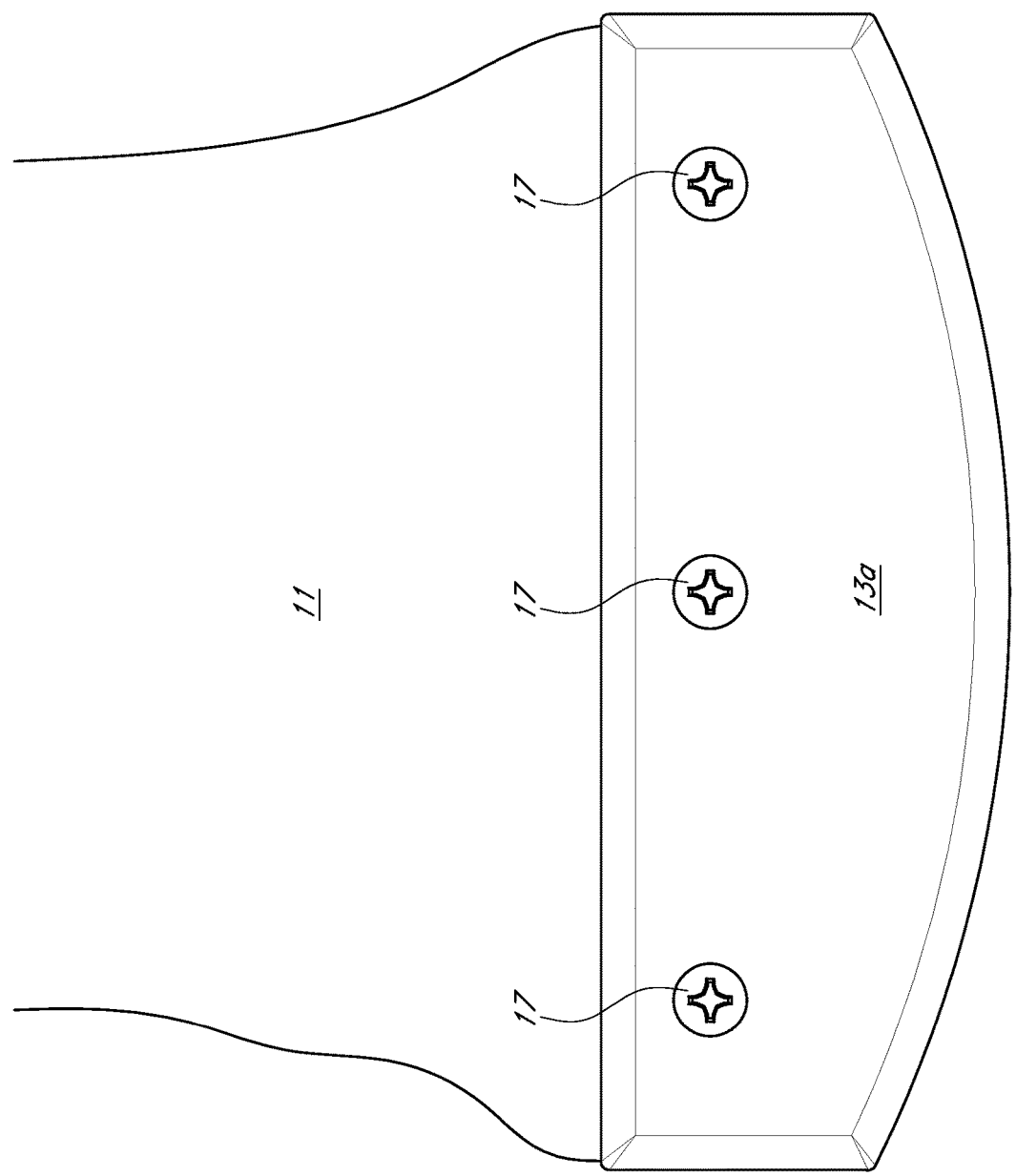
FIG. 2A is a view of the topside of the clamp of the Securement Device disclosed and deployed with a Securement Device.

FIG. 2A is a view of the topside of the clamp 13 of the Securement Device 10 disclosed and deployed with a Securement Device 10. In the embodiment shown in FIGS. 1-10 the closure device 12 is a plastic clamp 13 and configured for use and insertion of three (3) fasteners 17 which are shown as self-tapping screws. One of ordinary will appreciate that in no way is the closure device 12 limited to the particular configuration shown herein as clamp 13 and that other closure devices 12 may be used to practice the bendable cargo securement device 10 herein without departure from the spirit and intent of the invention. Variations in the design of the closure device 12 may include inclusion of a living hinge (not shown) along the anterior portion of the clamp 13, by way of example and without limitation, to keep the top portion 13a and bottom portion 13b attached without interfering with engagement with the tube end 11c. As shown the top (first) portion of the clamp 13a is positioned over the end of the tube 11c and engages directly with the tube wall 11a. As shown, three (3) apertures are positioned in the top portion of the clamp 13a for insertion of fasteners 17 which is disclosed as a self-tapping screw (not shown), without limitation or restriction. FIG. 2B is a view of the bottom (second) side 13b of the clamp of the Securement Device 10 disclosed. As shown, three (3) guide tubes 13d are positioned in the bottom (second) side 13b of the clamp. One of ordinary skill will appreciate that the apertures 13c and guide tubes 13d are aligned. Further, it will be appreciated that the fasteners 17 as disclosed pierce the end of the tube so that the fasteners engage with the end of the tube 11 via tube wall openings 11b. (not shown) One of ordinary skill will appreciate that the holes may be pre-configured in the tube wall 11a or may be created via the fastener 17 having a self-tapping type end as disclosed herein, without restriction or limitation. Further, although applicant has disclosed three (3) fasteners evenly spaced across the face of the clamp 13, other numbers of fasteners 17, in other configurations, may work without limitation or restriction, subject to the particular use, deployment or embodiment therein.

Figure 3:
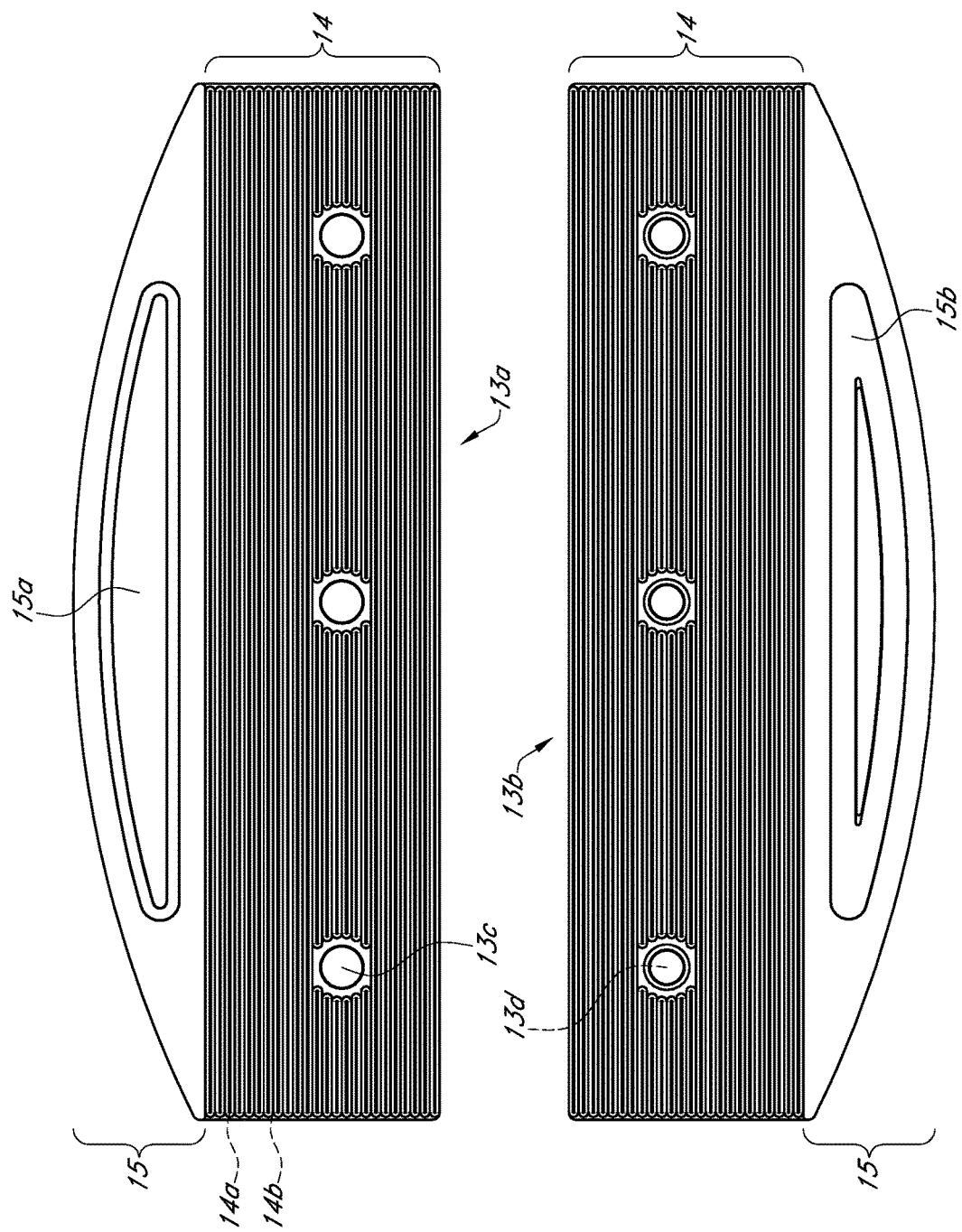
FIG. 3 is a view of the interior face of both the topside portion (upper picture) and the bottom side portion (lower picture) of the clamp.
Figure 3A:
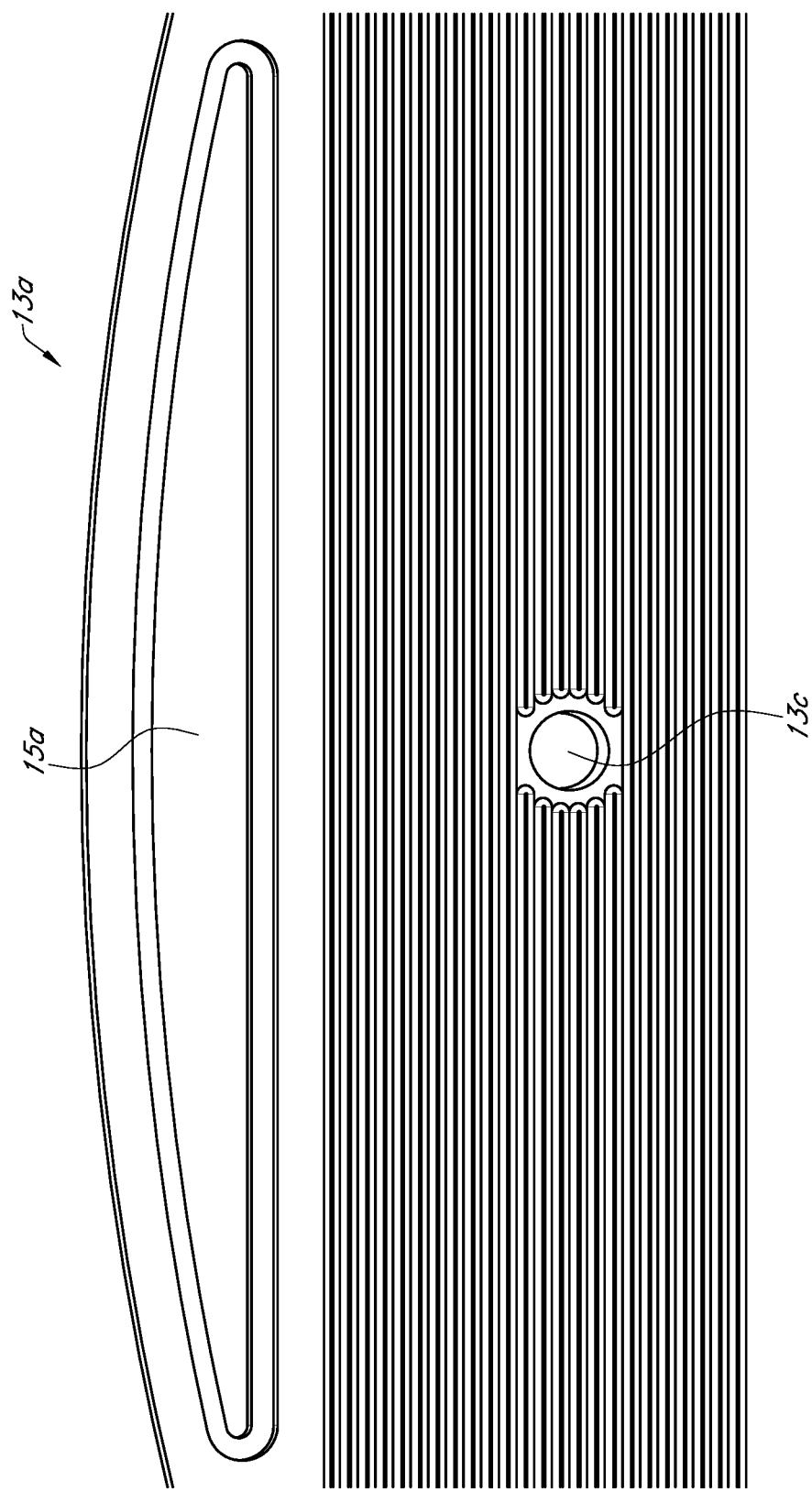
FIG. 3A is a detailed view of the topside of the clamp and particularly the recess positioned in the interior face of the topside of the clamp.
Figure 3B:
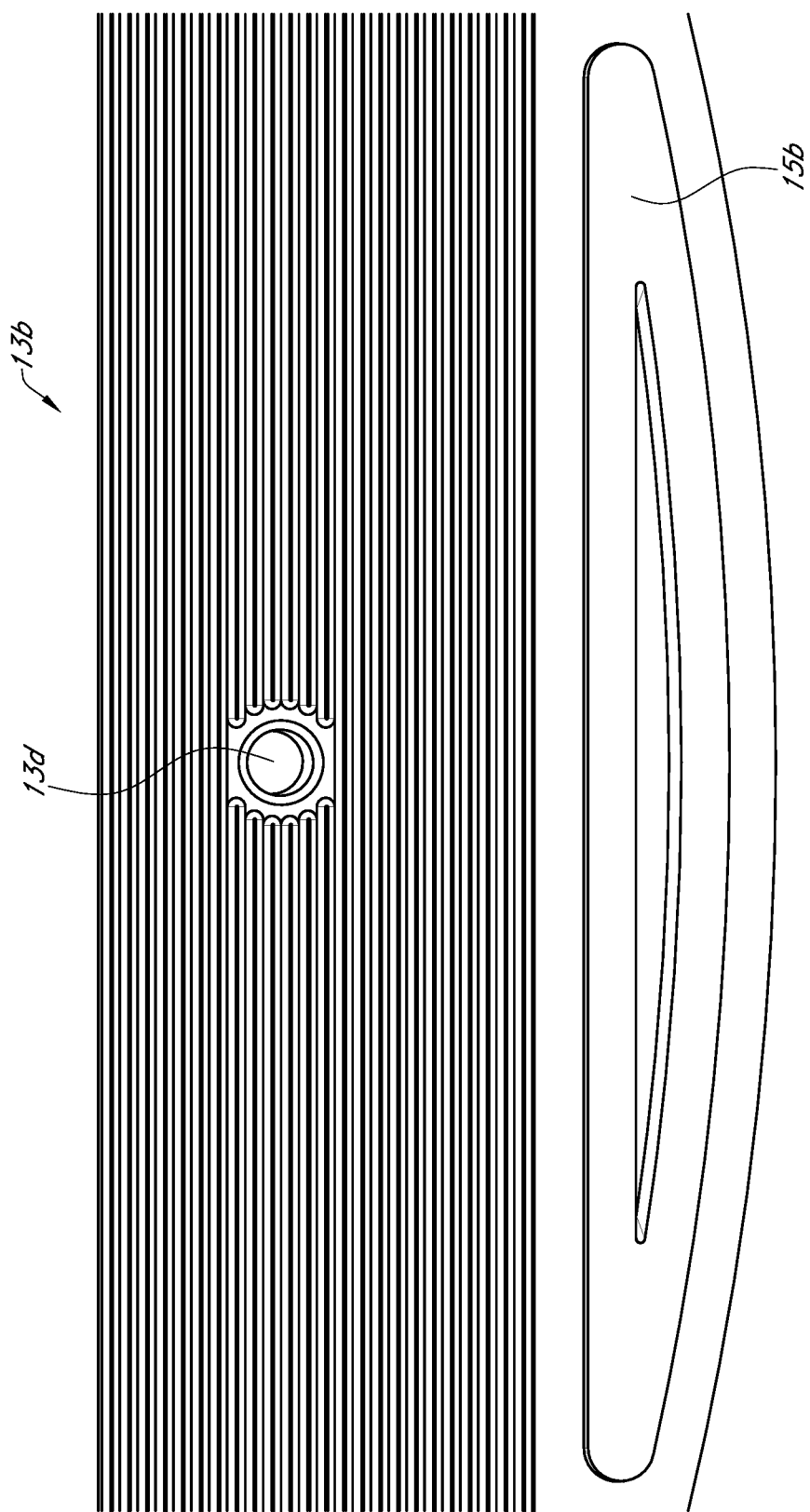
FIG. 3B is a detailed view of the bottom side of the clamp and particularly the ridge positioned in the interior face of the bottom side of the clamp.

FIG. 3 is a view of the interior faces of both the topside portion (upper picture) and the bottom side portion (lower picture) of the clamp, labeled 13a and 13b, respectively. FIG. 3A is a detailed view of the topside of the clamp 13a and particularly the locking recess 15a positioned in the interior face of the topside of the clamp 13a. As shown, the face of the top side of the clamp 13a has a contact zone 14 comprised of a combination of contact ridges and recesses (14a, 14b) positioned below the locking recess 15a. FIG. 3B is a detailed view of the bottom side of the clamp 13b and particularly the locking ridge 15b positioned in the interior face of the bottom side of the clamp 13b. As shown, the face of the bottom side of the clamp 13b also has a contact zone 14 comprised of a combination of contact ridges and recesses (14a, 14b) positioned below the locking ridge 15b. As shown, there are nine (9) ridges having a dimension of 0.0625-0.125 inches and nine (9) recesses having a similar dimension range of 0.0625-0.125 inches. One of ordinary skill will appreciate that other numbers of ridges and recesses having with other dimensions may also work for a particular application without restriction or limitation.

Figure 4:
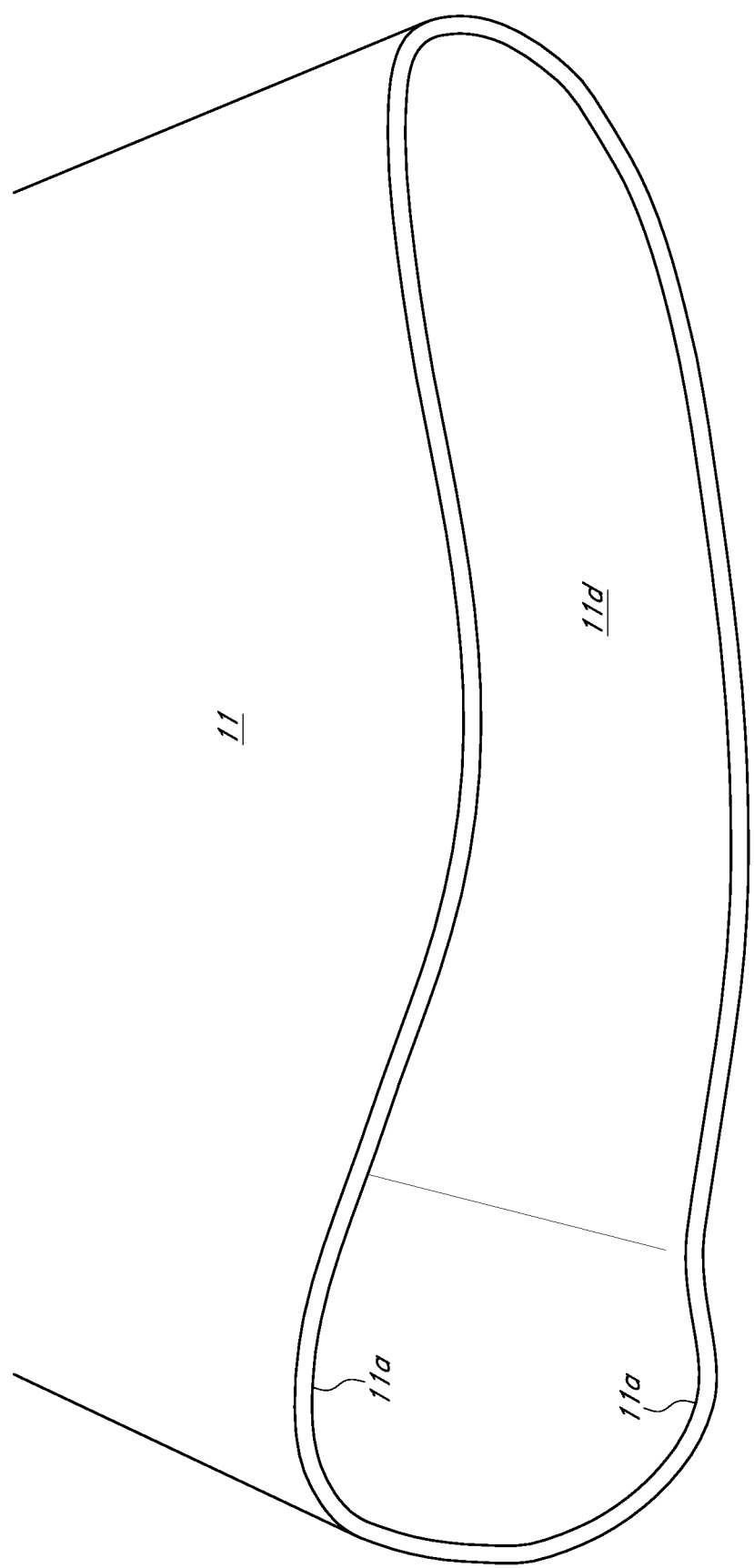
FIG. 4 is a perspective view of the end of the bendable tube prior to installation of the clamp.
Figure 5A:
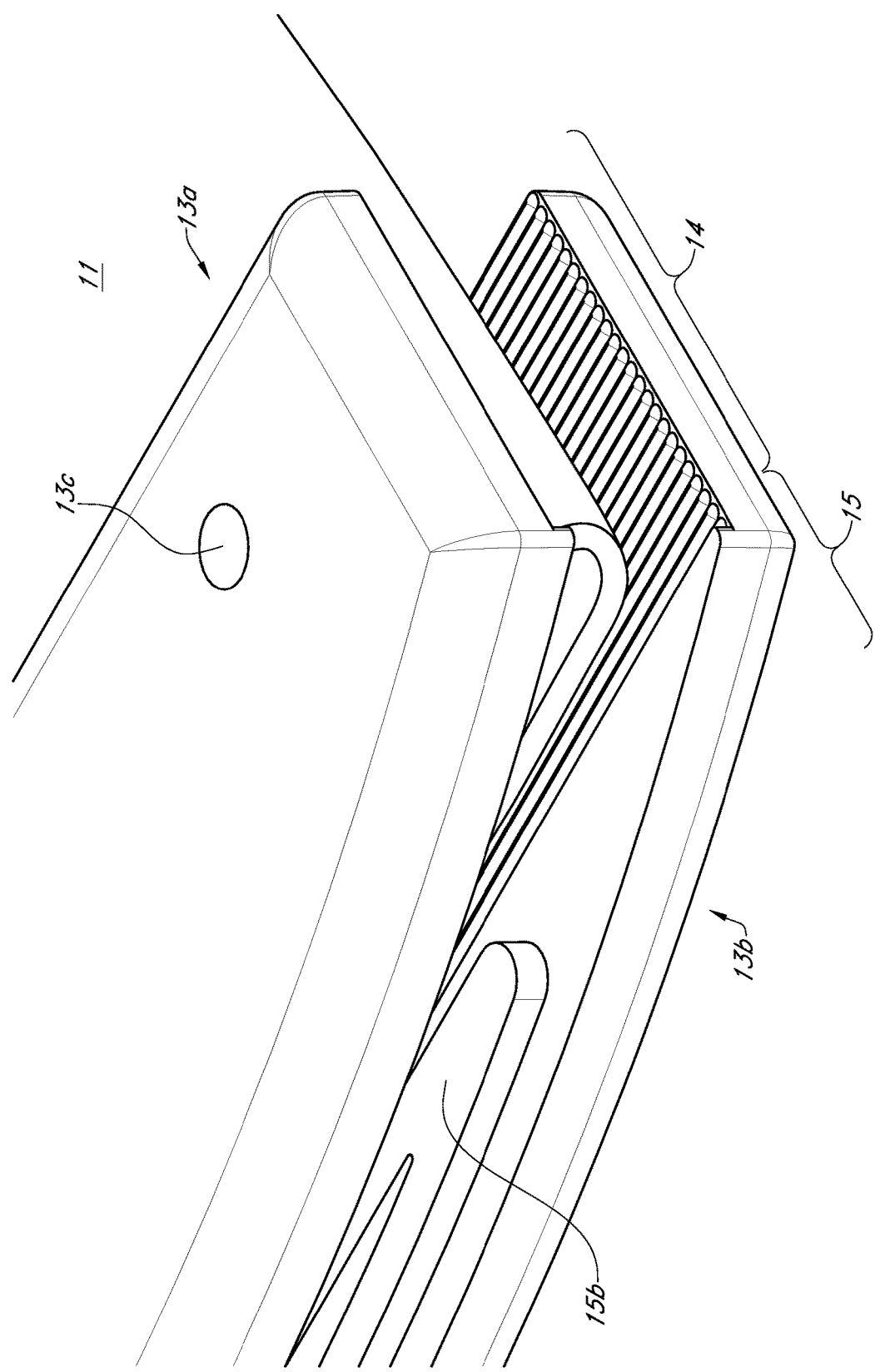
FIG. 5A is a perspective view of the top and bottom portions of the clamp with the end of the tube positioned therein.

FIG. 5 is a perspective view of the tube end 11c positioned on the bottom portion of the clamp 13b. FIG. 5A is a perspective view of the top and bottom portions of the clamp (13a, 13b) with the tube end 11c positioned therein. During attachment of the clamp 13 to the tube 11 for use of the Securement Device 10, the locking ridge 15b is inserted into and engages with the locking recess 15a. One of ordinary skill will appreciate the locking ridge 15b could be positioned on the bottom side of the clamp 13b and the locking recess 15a on the top side of the clamp 13a without departure from the spirit and intent of the disclosure. As disclosed, the locking ridge 15b and locking recess 15a are configured as a "half-moon" shape positioned towards the apex of the clamp 13 and above the contact zone 14 to engage and lock together for engagement with the tube wall 11a and sealing against the open end of the tube 11b. By way of example, and without limitation or restriction, the locking recess 15a disclosed could be configured as a plurality of locking recesses 15b to engage with a plurality of locking ridges 15b. Further, the shape of the locking recesses 15a and locking ridges 15b could vary from that disclosed. One of ordinary skill will appreciate that although not shown, other configurations, positions and shapes may work to align, engage and fix the position of the tube end with the clamp 13 without limitation or restriction, subject to the particular use, deployment or embodiment therein. FIG. 4 is a perspective view of the end of the bendable tube 11 prior to installation of the clamp 13. At least one particular advantage of the securement device 10 disclosed is the clamp 13 having the combination of a contact zone 14 and a locking recess 15a and locking ridge 15b for aligning, engaging with and fixing the position of the tube wall 11a, tube opening 11b and tube end 12 with the clamp 13 to ensure minimal loss of fill material 4 positioned within tube wall 11a during use and deployment. As disclosed in FIGS. 2-5, and discussed herein, the tube 11 and clamp 13 arrangement disclosed herein provides at least one particular advantage for the Securement Device 10 disclosed herein when deployed across any and all suitable uses for the Securement Device 10. (See discussion herein for FIGS. 6-10) Further, one of ordinary skill will appreciate that as disclosed, the clamp 13 may be installed for either temporary or permanent use of the Securement Device 10, i.e. the clamp 13 may be installed after fill material 4 is added to the tube 11 for deployment with the fill material 4 then removed, after removal of the clamp 13, and the tube rolled up for efficient storage until the next use, as a temporary use. One of ordinary skill will also appreciate that many others will prefer to permanently attach the clamp 13 with the Securement Device 10 in its filled mode as shown in FIG. 1. One of ordinary skill will appreciate that clamp 13 as disclosed is but one type of closure device 12 which may be used with the bendable cargo securement device and methods of its use as disclosed herein.

Figure 6:
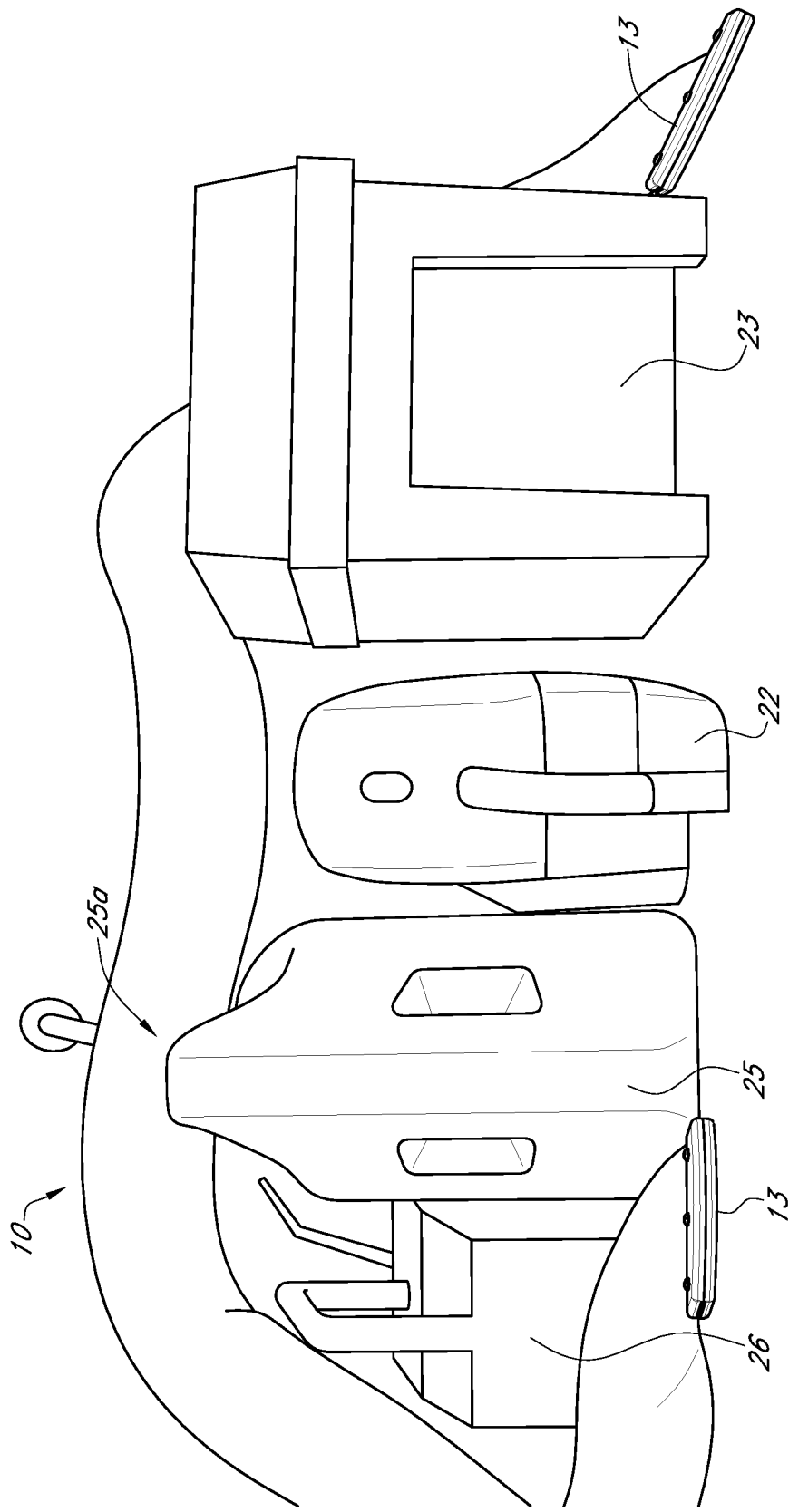
FIG. 6 is an end view of the Securement Device deployed in a pick-up box wherein the tube of the bendable securement device is positioned around and on top of an oil container, a gas container, a chain saw and a toolbox in the cargo section of a pick-up box.
Figure 7:
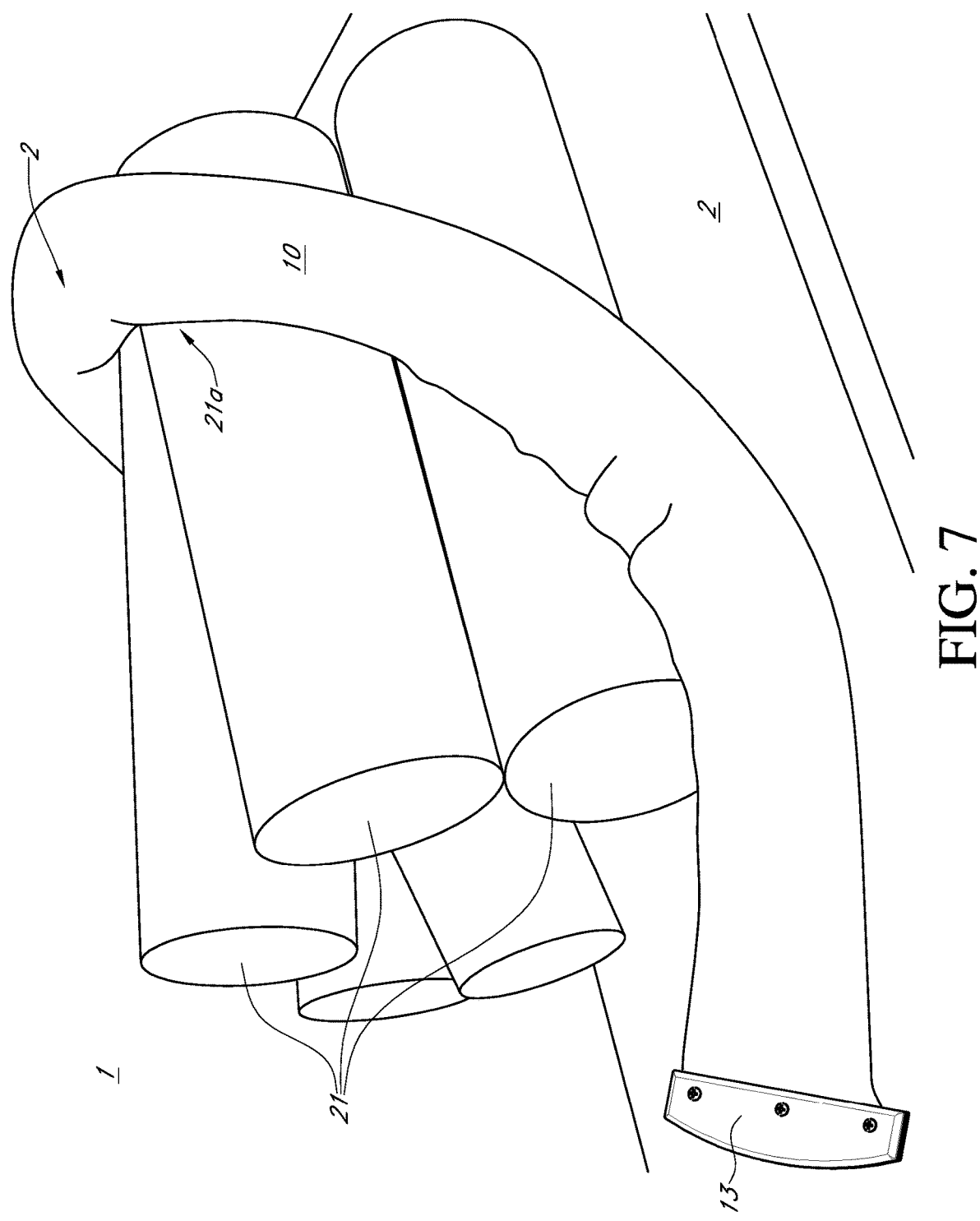
FIG. 7 is a perspective view of the Securement Device as deployed to secure a stack of logs within a truck pick-up box.

FIG. 6 is an end view of the Securement Device deployed in a pick-up box 1 wherein the tube 11 of the bendable securement device 10 is positioned around and on top of, a gas container 25, an oil container 26, a chainsaw 22 and a toolbox 23 in the cargo section of a pick-up box 1, proximate the tailgate (not shown). FIG. 7 is a perspective view of the Securement Device 10 as deployed to secure a stack of logs 21 within the cargo section of a pick-up box 1. FIG. 8 is a perspective view of the Securement Device 10 as deployed to secure an LP tank 24 and a car battery 27. FIG. 9 is a perspective view of the Securement Device 10 deployed to secure a combination of items in a pick-up box including a LP tank 24 and various boxes 24 wherein the Securement Device 10 is positioned over the boxes 24 and in front of the LP tank 24 in the pick-up box 1. FIG. 10 is a top front perspective view of the Securement Device 10 wherein the tube 11 of the bendable securement device 10 is positioned around a gas container 25 (perimeter 25a), a chain saw 22 (perimeter 22a) and a box 23 (perimeter 23a) in the cargo area of a pick-up box 1. FIGS. 6-10 illustrate the advantages that the bendable cargo securement device 10 conveys in that the flexible tubular section (tube) 11 conforms to a perimeter 20a of the shape of the securable objects 20, having either regular or irregular shapes, thereby improving the transmission and distribution of the weight of the filler material 4 allowing securement of the various securable objects 20. One of ordinary skill will appreciate that any securable object 20 has an infinite number of perimeters 20a representing the shape of the securable object 20 at any particular dimension (height, width, length) and combinations therein to which the shape of the flexible tube 11 of the bendable securement device 10 may conform to and engage with to stabilize a securable object 20 having either a regular or irregular shape. One of ordinary skill will appreciate that the various securable objects 20 in no way limit the breadth of the possible uses or applications for deployment of the Securement Device 10 and instead are mere illustrations of potential uses.

The Securement Device 10, as illustrated in FIGS. 1 and 6-10, may range in length from 4 foot to 12 foot for deployment, without restriction or limitation. One of ordinary skill will appreciate a preferred length for a consumer type deployment may be 6-7 feet having a diameter of 3-4 inches. When deployed with aggregate as the fill material 4, the Securement Device 10 would weigh in the range of 22-26 lbs.

Figure 11:
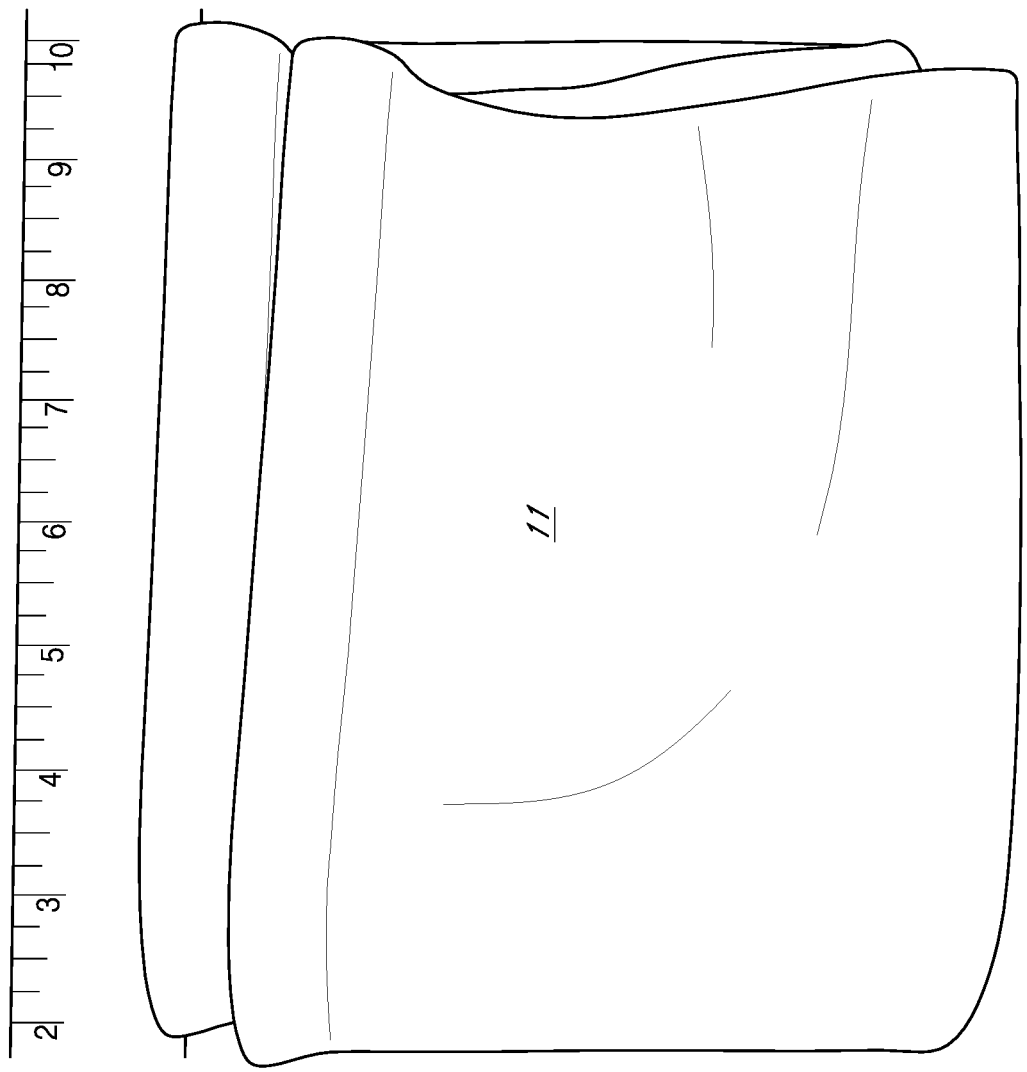
FIG. 11 is top view of the tube of the securement device as coiled after unboxing and prior to fill material being added or clamps being installed.

One of ordinary skill will appreciate a preferred length for a contractor or industrial deployment may be 10-12 feet having a diameter of 4-6 inches. When deployed with aggregate as the fill material 4, the Securement Device 10 would weigh in the range of 65-85 lbs. One of ordinary skill will appreciate that the proceeding dimensions are providing without restriction or limitation for the Securement Device 10 as disclosed as it may be deployed in a multitude of configurations as suitable for a particular need or deployment. The tube 11 of the Securement Device 10 may have a stored diameter of 2 inches to 10 inches, subject to the length of the tube 11 and the thickness of the tube walls therein. FIG. 11 provides a top view of the tube 11 of the securement device 10 as coiled after unboxing and prior to fill material 4 being added or clamps 13 being installed. As shown in FIG. 11, the coiled dimension of the tube 11 is approximately 5½ inches by 8 inches with a height of approximately 2 inches for a tube 11 having a length of 72 inches, diameter of 4 inches and a wall thickness of ¹⁄₁₆ inches. In other embodiments the wall thickness may be in the range of 1-3.5 mm.

As discussed, the tube 11 should be fabricated from material having sufficient flexibility and bendability to allow the Securement Device 10 to wrap around items (securable objects 20) while having suitable strength to avoid puncture/destruction from deployment. Further, the material chosen should not allow absorption or invasion of fluids into the interior of the tube 11d. In at least one embodiment, the Securement Device 10 may be constructed of material of sufficient strength and durability to support "bendability" to allow the weight of the fill material 4 positioned within the tube 11 to be transmitted through and against the various securable objects 20 to be secured without allowing the fill material 4 to leave the confines of the tube 11 and not degrade the tube 11 with repeated use as deployed which could allow intrusion of moisture or escape of fill material 4 via abrasions, cuts or punctures. In at least one embodiment, the tube wall thickness 11a is in the range of 1 mm to 3.5 mm and the material for construction is butyl rubber which is satisfactory in resisting degradation, avoiding intrusion of moisture and escape of fill material while still being "bendable" to generally conform to the shape of the object(s) to be secured to allow transmission of the weight or heft of the Securement Device 10 to the securable objects 20 to be secured thereby fixing their relative position and increasing their stability.

As disclosed the tube 11 of the Securement Device 10 may be fabricated from butyl rubber (synthetic) or natural rubber. Applicant has found this particular material, in at least one embodiment, in suitable dimensions and sizes as disclosed, meets the desired requirements of bendability, resistance to puncture and invasion of moisture while transmitting the weight of the fill material to the objects to be secured. Further, the clamp 13 configuration as disclosed works upon and engages satisfactorily with the ends of tube 11. One of ordinary skill will appreciate that other materials may be satisfactory, subject to the particular needs of a particular configuration and deployment.

Illustrative Method of Use and Installation

Figure 12:
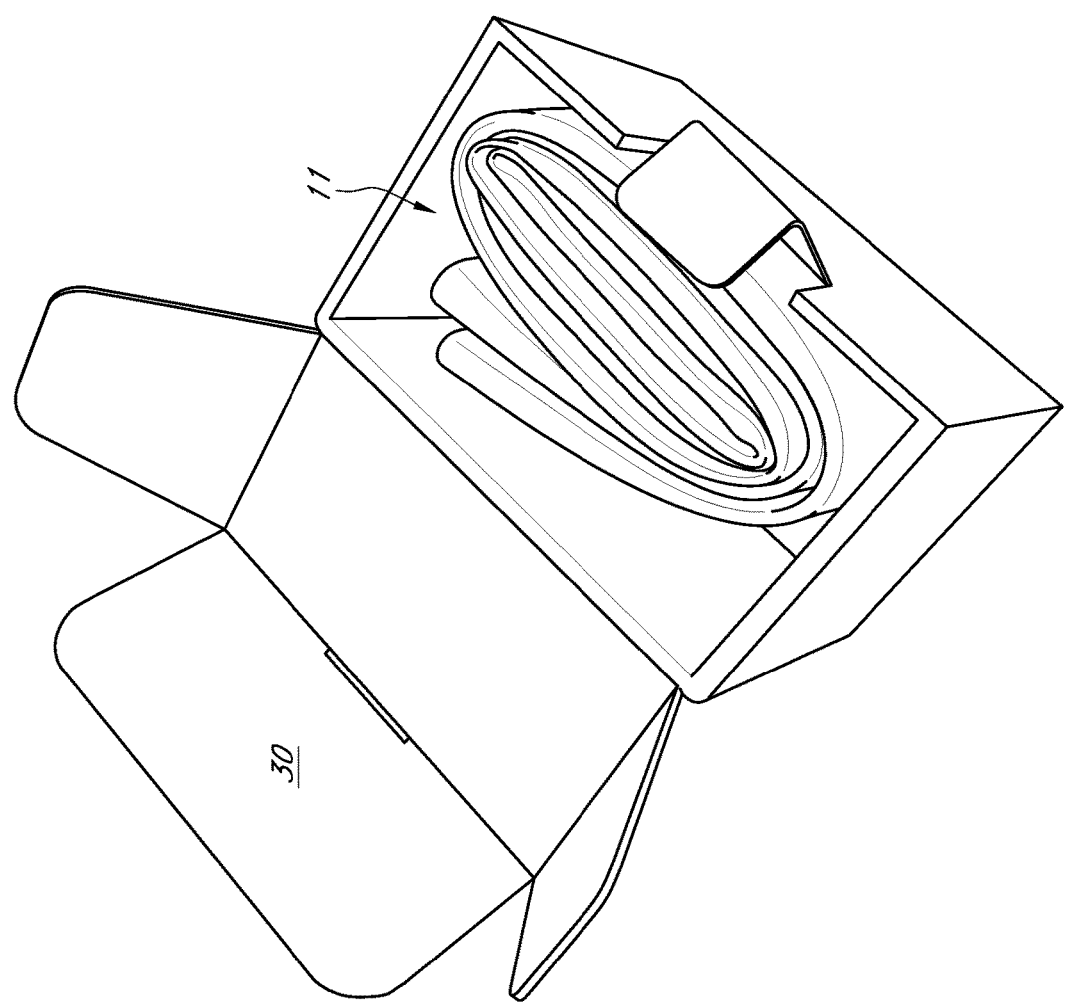
FIG. 12 is a perspective view of the Securement Device prior to assembly before unboxing illustrating the compact size of the unassembled product. The consumer version is approximately six (6) feet long when uncoiled but may be packaged for shipping or storage coiled in the box as shown having a dimension of approximately 5½ inches by 8 inches with a height of approximately 2 inches for a tube having a length of 72 inches, a diameter of 4 inches and a wall thickness of 1/16 inches.

In one embodiment the bendable cargo securement device 10 may be sold as a kit which could include a pair (2) of closure device 12, illustrated as clamps 13, a number of fasteners 17 (shown as 2-6 self-threading metal screws and a section of flexible tube 11. (See FIG. 12 illustrating the consumer version of the flexible tubular section 11 as shipped in its box 30.) As shown, the consumer type deployment may be 6-7 feet having a coiled diameter of 3-4 inches. In this embodiment, the user would open the box 30, remove the flexible tube portion 11, unroll or uncoil it, and lay it on a flat surface. (Not shown) As shown in FIGS. 1, 5 and 11, the uncoiled flexible tubular section 11 has both a first and a second end (11d), and the flexible tubular section 11 is hollow or empty 12. Typically, the user selects an end of the flexible tubular section 11d and engages a first closure device 12 configured for attachment and closure of the end of the flexible tubular section 11d.

As shown throughout FIGS. 1-11 and particularly at FIGS. 3 and 5A the clamps 13 have a top 13a and bottom 13a that are put together to form the closure device 12. As shown, the bottom half a clamp 13b is put under one end of the tube 11c, with the other half positioned over the top of the tube end 11c, aligning the tube end with the contact ridges 14a and contact recesses 14b, together the contact zone 14. As assembled, approximately ⅝" or 16 mm of the tube 11 should be covered by the clamp 13. Thereafter, the screws 17 should be inserted into the apertures 13c aligned with guide tubes 13d. The screws will pierce the tube wall 11a and go through from top portion 13a to the bottom portion 13b. The screws should be tightened until they are flush with the top of the clamp 13a and should not be overtightened. The design of the clamp 13 with contact zone 14 and locking zone 15 ensures that a snug fit is all that is required. The clamp 13 will compress and seal the tube end 11c. The user then loads a filler material 4 into the flexible tubular section 11 via the second end 11d. Fill material 4 may be pea gravel, small rock, dirt or a mixture therein and is preferably dry when entered into the flexible tubular section 11 to avoid freezing in colder climates and general degradation. Further, it may be beneficial to lift the flexible tube up (hold inclined to the vertical) and to shake it slightly to assist with induction of the fill material 4 into the flexible tubular section 4. Typically, the tube 11 is filled up with fill material 4 to approximately 3-6 inches from the open end and the fill material level to ensure the desired level of flexibility of the cargo securement device 10. Then the user closes the second end of the flexible tubular section 11 with the attachment of a second closure device 12 (clamp 13), as previously discussed, to form a bendable cargo securement device 10. The bendable cargo securement device 10 is now assembled and ready for deployment.

The following modifications, although not shown, would be obvious to one of ordinary skill in the art in view of the present disclosure. The various elements of the Securement Device 10 may be separately formed and later engaged with one another (e.g., via mechanical fasteners, material fusing, chemical adhesives, etc.) or integrally formed with one another therein. The materials used to construct the Securement Device 10 and various elements thereof will vary depending on the specific application of the Securement Device 10, but it is contemplated that rubber, butyl rubber, plastic, steel, aluminum, polymers, other synthetic materials, natural materials, and/or combinations thereof will be especially useful for some applications in whole or in part. Accordingly, the above-referenced elements may be constructed of any material known to those skilled in the art or later developed, which material is appropriate for the specific application of the Securement Device 10, without departing from the spirit and scope of the Securement Device 10 as disclosed and claimed herein.

Having described the preferred embodiments, other features of the Securement Device 10 will undoubtedly occur to those versed in the art, as will numerous modifications and alterations in the embodiments as illustrated herein, all of which may be achieved without departing from the spirit and scope of the Securement Device 10 disclosed herein. Accordingly, the methods and embodiments pictured and described herein are for illustrative purposes only, and the scope of the present disclosure extends to all method and/or structures for providing increased functionality, comfort, longevity, enjoyment and aesthetics in the use and deployment of the Securement Device 10 for holding and securing portable objects during transport in the cargo area of a pick-up truck or any other application requiring securement of objects 20. Furthermore, the methods and embodiments pictured and described herein are no way limiting to the scope of the Securement Device 10 and method of use unless so stated in the following claims.

It should be noted that the Securement Device 10 is not limited to the specific embodiments pictured and described herein, but is intended to apply to all similar apparatuses and methods for providing the various benefits and/or features of a Securement Device 10. Modifications and alterations from the described embodiments will occur to those skilled in the art without departure from the spirit and scope of the Securement Device 10. It is understood that the Securement Device 10 as disclosed herein extends to all alternative combinations of one or more of the individual features mentioned, evident from the text and/or drawings, and/or inherently disclosed. All of these different combinations constitute various alternative aspects of the Securement Device 10 and/or components thereof. The embodiments described herein explain the best modes known for practicing the Securement Device 10 and/or components thereof and will enable others skilled in the art to utilize the same. The claims are to be construed to include alternative embodiments to the extent permitted by the prior art.

While the Securement Device 10 has been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as illustrative only, with a true scope and spirit being indicated by the following claims.

What is claimed is:

1. A bendable cargo securement device comprising:
a) a flexible tubular section having a first end and a second end, wherein said flexible tubular section is formed with a wall having a thickness, enclosing a hollow interior, wherein the wall thickness is in the range of 0.9-4.0 mm, wherein the flexible tubular section may be coiled around itself in a storage position, wherein the flexible tubular section has a diameter in the range of 4-10 inches when coiled in the storage position, wherein the flexible tubular section is composed of rubber, butyl rubber, or a combination of rubber and butyl rubber;
b) a first closure device configured for attachment and closure of the first end of the flexible tubular section, wherein the first closure device is a first clamp having a first side and a second side, each first clamp side having a face that is configured to attach to and seal the first end of the flexible tubular section, wherein the first side face is configured with a locking ridge and the second side face is configured with a locking recess for coupled engagement of the first side and the second side of the first clamp;
c) a second closure device configured for attachment and closure of the second end of the flexible tubular section, wherein the second closure device is a second clamp having a first side and a second side, each second clamp side having a face that is configured to attach to and seal the second end of the flexible tubular section, wherein the second clamp first side face is configured with a locking ridge and the second clamp second side face is configured with a locking recess for coupled engagement of the first side and the second side of the second clamp; and,
d) wherein the flexible tubular section may be uncoiled for loading with a filler material via either the first end or the second end, closed at the first end with the attachment of the first closure device, loaded with the filler material, and then closed at the second end with the attachment of the second closure device for deployment as a securement device.

2. The bendable cargo securement device according to claim 1 wherein the flexible tubular section has a length in the range of 72-144 inches.

3. The bendable cargo securement device according to claim 2 wherein the flexible tubular section has a mass in the range of 15-100 lbs. when deployed with filler material.

4. The bendable cargo securement device according to claim 1 wherein the flexible tubular section is sufficiently flexible to allow the bendable cargo securement device when loaded with the filler material to engage with cargo comprised of a combination of irregular shaped objects and regular shaped objects for securement.

5. The bendable securement device according to claim 1 wherein the flexible tubular section is constructed of butyl rubber having a wall thickness in the range of 0.9-4.0 mm.

6. The bendable cargo securement device according to claim 1 wherein the flexible tubular section is sufficiently flexible to allow the securement device when loaded with the filler material to engage with both an irregular shaped object and a regular shaped object for securement.

7. The bendable cargo securement device according to claim 1 wherein the flexible tubular section is constructed of butyl rubber and is impermeable to moisture.

8. The bendable cargo securement device according to claim 7 wherein the flexible tubular section is sufficiently flexible to allow the securement device when loaded with the filler material to engage with both an irregular shaped object and a regular shaped object for securement.

9. The bendable cargo securement device according to claim 1 wherein the flexible tubular section is comprised of a material, or a mixture of the materials, selected from the group consisting of rubber, butyl rubber, plastic and combinations thereof.

10. The bendable cargo securement device according to claim 1 wherein the filler material is comprised of a material selected from the group consisting of pea gravel, rock, crushed rock, soil, dirt and combinations thereof.

11. The bendable cargo securement device according to claim 1 wherein the flexible tubular section has a mass in the range of 15-100 lbs. when deployed with filler material.

12. The bendable cargo securement device according to claim 1 wherein the closure devices are configured as clamps wherein each side of the respective clamp is configured with a contact zone for contact and engagement with the ends of the flexible tubular section having filler material therein and a locking zone for securement of the first and second sides of the clamp to each other.

13. The bendable cargo securement device according to claim 12 wherein the locking zone is comprised of a locking ridge and a locking recess, each having a half-moon shape and positioned towards an apex of the first end of each clamp and above the contact zone to engage and lock together for engagement with the wall of the flexible tubular section to seal against an open end.

14. The bendable cargo securement device according to claim 12 wherein the contact zone in each of the respective clamps is configured with at least one aperture therein configured for engagement with at least one fastener therein for cooperative coupled engagement therein between the sides of the clamps.

15. A bendable cargo securement device comprising:
a) a flexible tubular section having a first end and a second end, wherein said flexible tubular section is hollow and may be coiled around itself in a storage position;
b) a first closure device configured for attachment and closure of the first end of the flexible tubular section,
c) a second closure device configured for attachment and closure of the second end of the flexible tubular section, wherein each closure device is configured as a clamp, wherein each side of the respective clamp is configured with a contact zone for contact and engagement with the ends of the flexible tubular section having filler material therein and a locking zone for securement of the first and second sides of the clamp to each other, wherein the locking zone of the clamps is further comprised of at least one contact ridge and at least one contact recess configured for cooperative coupled engagement therein, wherein the locking zone is comprised of a locking ridge and a locking recess, each having a half-moon shape and positioned towards an apex of a first end of each clamp,
d) wherein the flexible tubular section may be uncoiled for loading with a filler material via the second end and then closed at the second end with the attachment of the second closure device for deployment as a bendable cargo securement device.

* * * * *